United States Patent Office 2,782,727
Patented Feb. 26, 1957

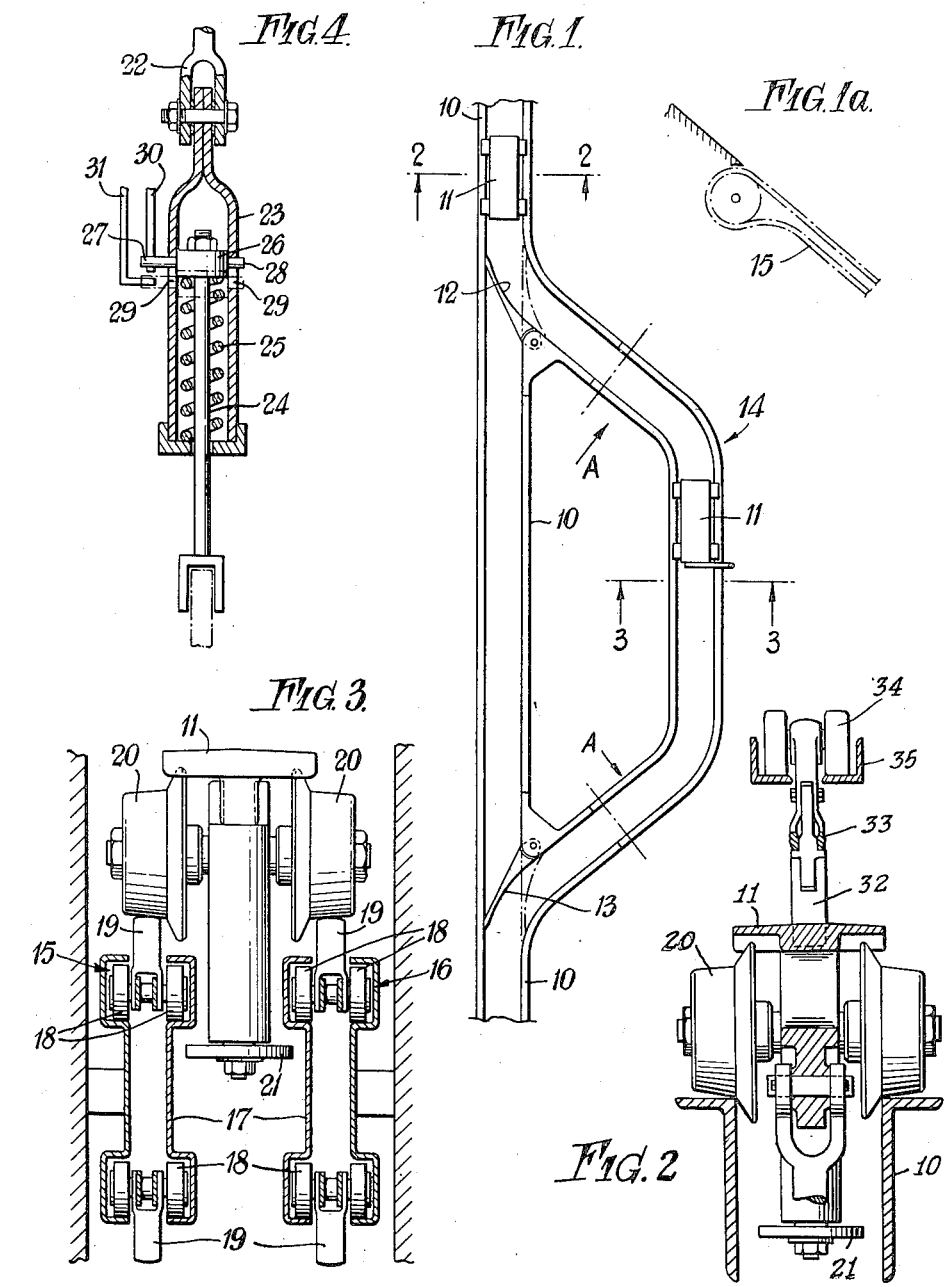

2,782,727
CONVEYOR SYSTEMS
Donald Mayer King, Hitchin, England
Application June 2, 1953, Serial No. 359,009
Claims priority, application Great Britain June 4, 1952
6 Claims. (Cl. 104—172)

This invention relates to conveyor systems of the kind wherein load carrying trolleys are propelled along a track through the medium of pusher dogs or driving abutments which depend from a driving chain so arranged as to travel in a path above that along which said load carrying trolleys are caused to run.

According to the invention in a conveyor system of the kind referred to, one or more loop or branch tracks is or are arranged at either or both sides of the main conveyor track along which the load carrying trolleys are normally propelled, said latter track incorporating switch devices whereby said trolleys may be diverted from such track to the or any loop or branch track and vice versa and each loop or branch track comprising one or more endless driven chains adapted to support and to impart movement to any load carrying trolley diverted thereonto, the arrangement being such that any trolley present on a loop or branch track will normally be progressed along the latter but may be arrested at one or more points without any interruption or variation of the drive to the chain or chains constituting the same.

In order that the said invention may be clearly understood and readily carried into effect the same will be hereinafter more fully described with reference to the accompanying drawings in which:

Figure 1 is a plan view illustrating diagrammatically a section of a conveyor system;

Figure 1a is a side elevational view looking in the direction of the arrows A in Figure 1;

Figure 2 is a section through a load carrying trolley taken on the line 2—2 of Figure 1;

Figure 3 is a view taken on the line 3—3 of Figure 1;

Figure 4 is a sectional view showing a load bar attachment for a load carrying trolley.

In the embodiment of the invention now to be described there is provided a main conveyor comprising a fixed overhead track hereinafter termed the "main track" which consists of two spaced parallel rails or running surfaces. The main track serves to support load carrying trolleys which comprise a frame or carriage having a plurality of freely rotatable wheels or rollers mounted thereon in such a manner as to engage and run on the rails or running surfaces constituting said main track. Depending from each trolley is a clevis or load bar attachment which is adapted to pass between the rails or running surfaces and to project below said main track. Disposed vertically above the main track is a second track, hereinafter termed the chain trolley track, upon which chain carrying trolleys are supported, a driving chain being suspended from said latter trolleys and having at spaced points therealong depending pusher dogs or driving abutments which are adapted to engage the load carrying trolleys present on the main track and to impart motion thereto when a drive is imparted to said driving chain. Such a conveyor is generally well known and will not be further described herein.

Referring now to the drawings, 10 denotes the aforesaid main track along which load carrying trolleys, two of which are indicated at 11, are propelled by virtue of the engagement therewith of pusher dogs or driving abutments carried by an endless driving chain. In Figure 2 one pusher dog is indicated at 32 such dog being carried by the endless driving chain 33 which latter is suspended from chain carrying trolleys one of which is indicated at 34. 35 denotes the second or upper track on which the chain carrying trolleys are supported.

Located at any selected number of points or sections along the main track 10 are track switches such as are indicated at 12 and 13, which are adapted on operation to allow passage of load carrying trolleys from said main track on to loop or branch tracks and vice versa. Such loop tracks one of which is indicated generally by 14 in Figure 1, may be disposed at either or both sides of the main track 10, the arrangement being such that each loop track will communicate at both ends with said main track so that any trolley diverted from the latter on to a loop track may on being moved along the length of said loop track be fed back again onto said main track. The arrangement is also such that the chain track and hence the driving chain with its pusher dogs or driving abutments will be disposed only above the main track 10 and will not extend over any of the loop tracks so that on diversion of a trolley from said main track and on to a loop track the drive thereto from the driving chain will be discontinued until such time as said trolley is returned to the main track. It will be appreciated that the provision of such loop tracks will allow for the storage and marshalling of trolleys at selected points along the conveyor path.

As will be seen from Figure 3 each loop or branch track may conveniently comprise two matched endless chains 15, 16 which are arranged in spaced parallel relationship and are adapted to be driven in the same direction and at the same speed. The chains 15, 16 of each loop or branch track may conveniently be driven from the main track conveyor chain. Each chain 15, 16 is disposed within a supporting track or channel 17 and incorporates a plurality of rollers 18 which are arranged in spaced relationship along the length of the chain and are adapted to bear and run on running surfaces present in or on said track or channel 17, thereby effectively to support said chain. Mounted on the upper or outer surface of each chain is a plurality of plate or platform members 19 which are adapted when in the upper flight of the chain to form a continuous or substantially continuous band or running surface. The arrangement is therefore such that each loop or branch track will effectively comprise two endless parallel travelling bands which correspond to the rails or running surfaces of the main conveyor 10 and will serve to provide running surfaces for the wheels or rollers 20 carried by the load carrying trolleys. As is apparent from Figures 2 and 3 each load carrying trolley is provided with a pair of depending guide rollers 21 which are located one at the fore and the other at the aft end of the trolley, such rollers being freely rotatable and normally disposed between the rails or running surfaces of the main track 10 when the trolley is on the main conveyor and between the tracks or channels 17 housing the endless chains 15, 16 when said trolley is present on a loop or branch track. The guide rollers 21 are so dimensioned and arranged that they will prevent any undesired lateral movement of the trolley when on the loop or branch track.

Attached to the depending clevis or load bar attachment 22 associated with each load carrying trolley 11 is a tubular element 23 which is adapted to house a portion of a load bar or rod 24, the latter being resiliently supported by means of a spring 25 within said tubular element for axial sliding movement relatively thereto and being adapted to project downwardly from the lower end of said element. The load bar or rod 24 is so formed at its lower end as to allow of the attachment of loads, a load hook, or other load carrier thereto. Mounted at or adjacent the upper end of the load bar or rod 24 which is disposed within the tubular element 23 is a collar 26 adapted to receive and support two radially directed pegs 27, 28 which are arranged at diametrically opposed points on said collar. The pegs 27, 28 are adapted to project through slots 29 in the wall of the tubular element and thus to limit the extent of the axial movement of which the bar or rod 24 is capable. The collar 26 conveniently serves as an abutment for one end of the spring 25 which is disposed around the bar or rod and bears at its lower end on the base of the tubular element, said spring being adapted normally to urge said bar or rod upwardly into its uppermost position wherein the pegs 27, 28 will abut against the upper ends of their respective slots. Mounted at preselected points along the loop or branch track 14 are rigid stop members 30, 31 which as can clearly be seen from Figure 4, are arranged at two differing levels, the arrangement being such that when a bar or rod 24 is unloaded and is urged by the spring 25 into its uppermost position, the peg 27 will co-operate with any of the stops such as 30 at the upper level while when the bar or rod 24 is loaded and is moved downwardly against the action of the spring 25, the peg 27 will co-operate with any of the stops such as 31 at the lower level.

When any load carrying trolley is diverted onto a loop or branch track it will be moved along the latter, due to the action of the endless chains 15, 16 but it will be appreciated that by virtue of the fact that said trolley is supported on said chains by the freely rotatable wheels or rollers 20 it will be possible to stop the same at any required point without interrupting or varying in any way the drive to said chains 15, 16. Thus by suitable arrangement of the stops such as 30, 31, along a loop or branch track 14 it will be feasible for example, to stop a loaded trolley at a preselected unloading point, such trolley, after unloading, being caused by the chains 15, 16 to move along to a loading point whereat it will be arrested automatically by virtue of the engagement of the peg 27 with a stop 30 until re-loaded whereafter it will again be caused by the chains to move along to a further unloading point or fed back into the main conveyor line.

I claim:

1. In a conveyor system comprising in combination a plurality of individual load carrying trolleys, a main track adapted to support said trolleys, an endless driven chain located above said main track, pusher dogs depending from said chain at spaced points therealong to engage trolleys present on said main track and to propel the same along the latter, at least one switch device in said main track and a branch track communicating with said main track in the region of the switch device so that on actuation of the latter trolleys may be diverted from said main track to said branch track and vice versa, the provision of a branch track comprising a pair of endless driven chains disposed in spaced parallel relation so as to provide support for the load carrying trolleys, stop devices disposed at differing levels and at spaced points along said branch track, a load bar mounted on each trolley for limited vertical movement relatively thereto, resilient means associated with said load bar so that the latter will be depressed against the action of such resilient means when loaded and raised by said resilient means when unloaded and an outwardly directed arm also associated with said load bar, the arrangement being such that when a trolley is present on the branch track the arm on the load bar is dependent upon the loading of said trolley to co-operate with a selected stop device located along the branch track.

2. A conveyor system as in claim 1, wherein fixed guide members are disposed at the opposite side of each of said pair of chains and means are associated with each trolley adapted when the latter is present on the branch track to co-operate with said guide members thereby to prevent lateral displacement of the trolley relatively to each of said pair of chains.

3. In a conveyor system comprising in combination a plurality of individual load carrying trolleys, a main track adapted to support said trolleys, an endless driven chain located above said main track, pusher dogs depending from said chain at spaced points therealong to engage trolleys present on said main track and to propel the same along the latter, at least one switch device in said main track and a branch track communicating with said main track in the region of the switch device so that on actuation of the latter trolleys may be diverted from said main track to said branch track and vice versa, the provision of a branch track comprising a pair of endless driven chains disposed in spaced parallel relationship, a plurality of elements associated with each of said pair of chains so that the upper flights thereof will provide two parallel and substantially continuous running surfaces on which load carrying trolleys may be supported, stop devices disposed at differing levels and at spaced points along said branch track, a load bar mounted on each trolley for limited vertical movement relatively thereto, resilient means associated with said load bar so that the latter will be depressed against the action of such means when loaded and raised by said means when unloaded and an outwardly directed arm also associated with said load bar, said stop devices being positioned with respect to said arm such that when a trolley is present on the branch track the arm on the load bar will, dependent upon the loading of said trolley co-operate with a selected stop device located along the branch track.

4. A conveyor system as in claim 3, wherein fixed guide members are disposed at opposite sides of each chain and means are associated with each trolley adapted when the latter is present on the branch track to co-operate with said guide members thereby to prevent lateral displacement of the trolley relatively to said running surfaces.

5. In a conveyor system comprising in combination a plurality of individual load carrying trolleys, a main track adapted to support said trolleys, an endless driven chain located above said main track, pusher dogs depending from said chain at spaced points therealong to engage trolleys present on said main track and to propel the same along the latter, rollers on said trolleys for facilitating the movements of said trolleys along said track at least one switch device in said main track and a branch track communicating with said main track in the region of the switch device so that on actuation of the latter trolleys may be diverted from said main track to said branch track and vice versa, the provision of a branch track comprising a pair of endless driven chains disposed in spaced parallel relationship, a plurality of rollers spaced along each of said pair of chains for the grinding of said pair of chains, stop devices disposed at differing levels and at spaced points along said branch track, a running surface at the underside of each trolley and carried by said pair of chains, the frictional engagement between said surface and the rollers on said trolleys being sufficient to cause said trolleys to travel with the chains, a load bar mounted on each trolley for limited vertical movement relatively thereto, resilient means associated with said load bar so that the latter will be depressed against the action of such means when loaded and raised by said means when unloaded and an outwardly directed arm also associated with said load bar, the arrangement being such that when a trolley is present on the branch track the arm on the load bar will, dependent upon the loading of said trolley co-operate with a selected stop device located along the branch track.

6. A conveyor system as in claim 4, wherein fixed guide members are disposed at opposite sides of each chain and means are associated with each trolley adapted, when the latter is present on the branch track, to cooperate with said guide members thereby to prevent lateral displacement of the trolley relatively to the chains.

References Cited in the file of this patent

UNITED STATES PATENTS

| Number | Name | Date |
|---|---|---|
| 1,635,276 | Johnson | July 12, 1927 |
| 1,778,484 | Da Costa | Oct. 14, 1930 |
| 1,810,417 | Francis | June 16, 1931 |
| 1,921,109 | Webb et al. | Aug. 8, 1933 |
| 2,075,918 | Waalkes | Apr. 6, 1937 |
| 2,128,821 | Horn | Aug. 30, 1938 |
| 2,161,388 | Rosenthal | June 6, 1939 |
| 2,249,531 | Landahl | July 15, 1941 |
| 2,640,585 | Orwin | June 2, 1953 |

FOREIGN PATENTS

| Number | Country | Date |
|---|---|---|
| 566,129 | France | Feb. 9, 1926 |